United States Patent
Sczomak et al.

(10) Patent No.: US 9,915,221 B2
(45) Date of Patent: Mar. 13, 2018

(54) SYSTEM AND METHOD FOR ENGINE COMBUSTION

(71) Applicant: GM GLOBAL TECHNOLOGY OPERATIONS LLC, Detroit, MI (US)

(72) Inventors: David P. Sczomak, Troy, MI (US); Robert J. Gallon, Northville, MI (US); Arun S. Solomon, Rochester Hills, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 0 days.

(21) Appl. No.: 15/151,526

(22) Filed: May 11, 2016

(65) Prior Publication Data

US 2017/0145949 A1 May 25, 2017

Related U.S. Application Data

(60) Provisional application No. 62/259,982, filed on Nov. 25, 2015.

(51) Int. Cl.
| | |
|---|---|
| *F02B 31/08* | (2006.01) |
| *F02F 1/42* | (2006.01) |
| *F02D 41/00* | (2006.01) |
| *F02M 35/108* | (2006.01) |
| *F02D 9/10* | (2006.01) |

(52) U.S. Cl.
CPC ............ *F02F 1/425* (2013.01); *F02D 9/1095* (2013.01); *F02D 41/0002* (2013.01); *F02D 41/0097* (2013.01); *F02M 35/1085* (2013.01); *F02D 2041/0015* (2013.01); *F02D 2200/101* (2013.01)

(58) Field of Classification Search
CPC ........ F02F 1/425; F02F 1/4235; F02F 1/4242; F02D 41/0002; F02D 41/0097; F02D 2041/0015; F02B 31/08
USPC .......................... 123/302, 306, 308, 336, 442
See application file for complete search history.

(56) References Cited

U.S. PATENT DOCUMENTS

| | | | | | |
|---|---|---|---|---|---|
| 4,924,840 | A | * | 5/1990 | Wade ...................... | F02D 21/08 123/568.19 |
| 5,273,014 | A | * | 12/1993 | Mitobe ................... | F02B 31/00 123/308 |
| 5,592,917 | A | * | 1/1997 | Kim ....................... | F02B 31/085 123/308 |
| 5,765,525 | A | * | 6/1998 | Ma .......................... | F02B 31/04 123/308 |
| 6,055,958 | A | * | 5/2000 | Aoyama ............... | F02B 31/087 123/184.55 |

(Continued)

*Primary Examiner* — Hai Huynh
(74) *Attorney, Agent, or Firm* — Quinn IP Law

(57) ABSTRACT

A combustion system for use with one or more cylinder bores of an internal combustion engine includes at least one cylinder head defining first and second intake ports in fluid communication with the one or more cylinder bores. A flap is adjustably connected to the at least one cylinder head. The flap includes a first flap portion cooperating with the first intake port extending from an arm and a second flap portion cooperating with the second intake port extending from the arm and disposed adjacent the first flap portion. A controller in electrical communication with an actuator monitors the condition of the engine and actuates the flap to position the first and second flap portions between first and second positions to create a first combustion condition and a second combustion condition.

11 Claims, 4 Drawing Sheets

(56) References Cited

U.S. PATENT DOCUMENTS

| | | | | |
|---|---|---|---|---|
| 6,347,787 | B1 * | 2/2002 | Tobinai | F02B 25/22 261/23.3 |
| 6,349,925 | B1 * | 2/2002 | Tobinai | F02M 17/00 261/23.3 |
| 6,553,959 | B2 * | 4/2003 | Xu | F02B 17/005 123/295 |
| 6,591,794 | B2 * | 7/2003 | Toda | F02B 25/14 123/73 A |
| 6,742,495 | B2 * | 6/2004 | Ashida | F02B 31/04 123/310 |
| 6,896,245 | B2 * | 5/2005 | Suzuki | F02M 7/12 261/23.2 |
| 7,104,253 | B1 * | 9/2006 | Dow | F02B 25/22 123/337 |
| 7,258,104 | B2 * | 8/2007 | Young | F02D 13/0207 123/302 |
| 8,453,998 | B2 * | 6/2013 | Pattullo | F02D 9/1065 261/23.2 |

* cited by examiner

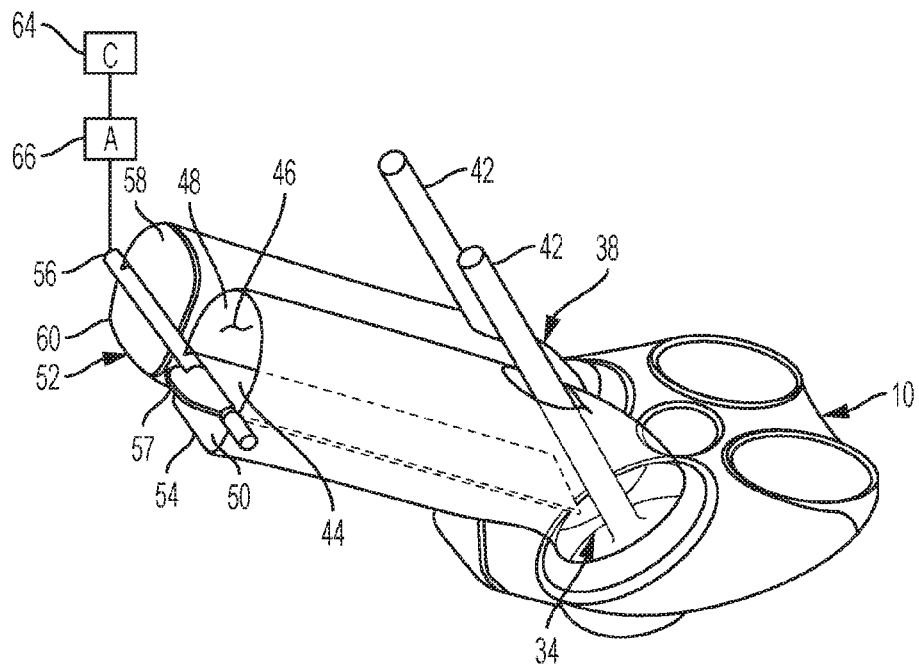
FIG. 3
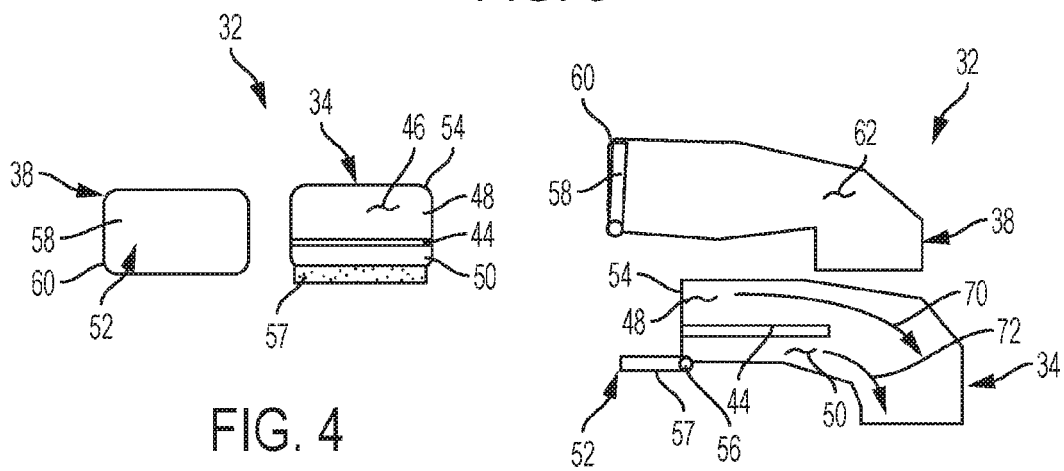
FIG. 4
FIG. 5

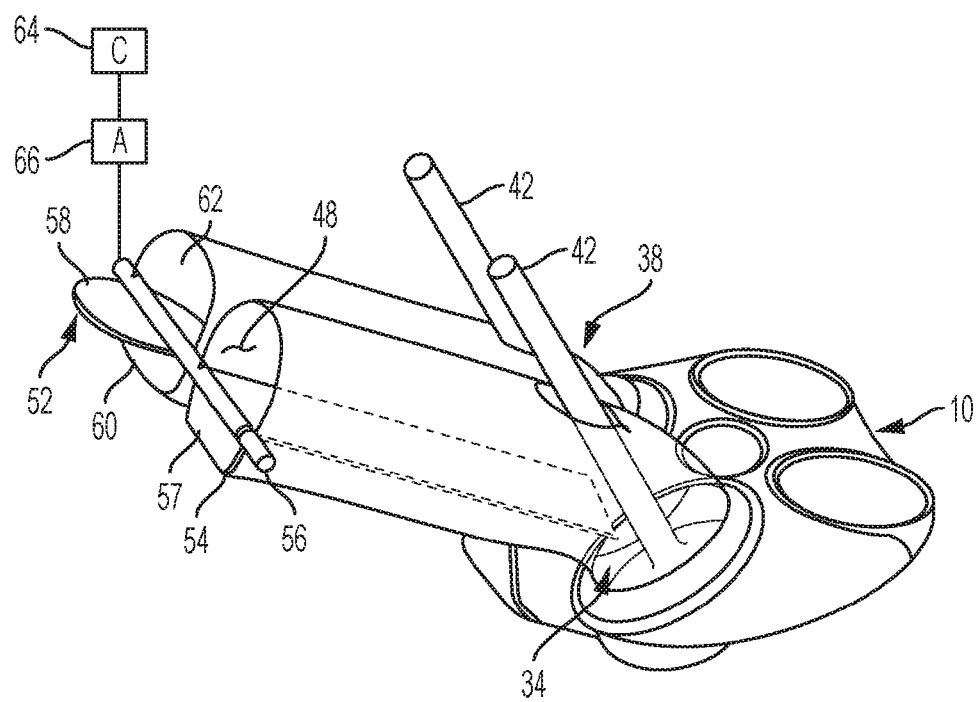
FIG. 6
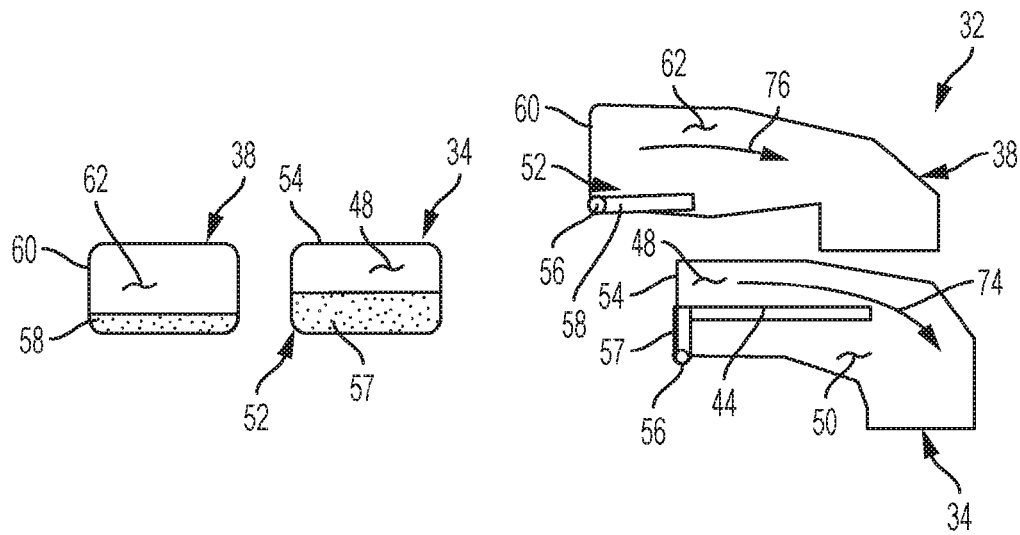
FIG. 7
FIG. 8

SYSTEM AND METHOD FOR ENGINE COMBUSTION

CROSS REFERENCE TO RELATED APPLICATIONS

This application claims the benefit of U.S. Provisional Patent Application No. 62/259,982, entitled "SYSTEM AND METHOD FOR ENGINE COMBUSTION" and filed on Nov. 25, 2015, which is incorporated by reference in its entirety in this disclosure.

STATEMENT REGARDING FEDERALLY SPONSORED RESEARCH OR DEVELOPMENT

This invention described herein was made with government support under DE-EE0006853 of the Lean Miller Cooperative Agreement awarded by the Department of Energy. The federal government may have certain rights in the invention.

TECHNICAL FIELD

The disclosure generally relates to an internal combustion engine, and more specifically to a system and method for combustion in the internal combustion engine.

BACKGROUND

Operation of a four-stroke internal combustion engine usually includes an intake stroke, a compression stroke, a power stroke and an expansion stroke. In normal operation, during the intake stroke of the internal combustion engine, an intake valve is opened as a piston is moved downward through a cylinder. At low speed or load engine conditions, a swirl effect or rotation of a fluid mixture around an axis of the cylinder may be used to promote engine performance.

Alternatively, at high speed or load engine conditions, a tumble effect for a fluid generally represents the fluid mixture spinning around the cylinder along an axis parallel to the crankshaft. Effective fuel economy and performance of an engine may be affected if the tumble effect or swirl effect is not managed properly or applied at an appropriate operation cycle of the engine.

SUMMARY

An internal combustion engine incorporating a combustion system for use with one or more cylinder bores of the internal combustion engine is disclosed. The engine includes a block defining a crankcase chamber and at least one bore extending from and in fluid communication with the crankcase chamber. At least one cylinder head is attached to the block and defines a first intake port and a second intake port. Each of the first and second intake ports includes a first end having an opening provided therein, an opposing second end in fluid communication with the one or more cylinder bores and an inner periphery defined between the first and second ends.

A flap is adjustably connected to the at least one cylinder head having a first flap portion cooperating with the first intake port removably secured to and extending from an arm and a second flap portion cooperating with the second intake port that is removably secured to and extends from the arm and disposed adjacent the first flap portion. An actuator is operatively connected to the arm of the flap to position the first and second flap portions to create a first combustion condition and a second combustion condition. A controller in electrical communication with the actuator is configured to monitor the condition of the engine and actuate the flap to position the first and second flap portions to generate the first combustion condition or the second combustion condition.

The first intake port further comprises a dividing member extending at least partially through the inner periphery of the first intake port to create first and second flow portions therein. The first flap portion of the flap is sized to at least partially cover and substantially close the second flow portion in the first intake port when the first flap portion is disposed adjacent the opening of the first intake port. The first combustion condition is created when the flap is moved to a first position such that the first flap portion is moved away from the opening in the first intake port and the second flap portion is moved adjacent the opening in the second intake port to substantially close the opening in the second intake port.

The second combustion condition is created when the flap is moved to a second position such that the first flap portion is moved adjacent the opening in the first intake port to substantially close the second flow portion and the second flap portion is moved away from the opening in the second intake port. The first and second flap portions are independently mounted adjacent the first and second intake ports to be moved between the first position and the second position. One or more intake valves extending at least partially through one or more of the first and second intake ports that are reciprocally moved between a closed position and an actuated position wherein the intake valves allow the flow of a fluid through the first and second intake ports into the one or more cylinder bores.

In another embodiment of the disclosure, a combustion system for use with one or more cylinder bores of an internal combustion engine includes at least one cylinder head attached to a block. The at least one cylinder head defines a first intake port and a second intake port. Each of the first and second intake ports includes a first end having an opening provided therein, an opposing second end in fluid communication with the one or more cylinder bores and an inner periphery defined between the first and second ends. A dividing member extending at least partially through the inner periphery of the second intake port to create first and second flow portions therein.

A flap is adjustably connected to the at least one cylinder head having a first flap portion cooperating with the first intake port removably secured to and extending from an arm and a second flap portion cooperating with the second intake port that is removably secured to and extends from the arm and disposed adjacent the first flap portion. An actuator is operatively connected to the arm of the flap to position the first and second flap portions to create a first combustion condition and a second combustion condition. A controller in electrical communication with the actuator is configured to monitor the condition of the engine and actuate the flap to position the first and second flap portions to generate the first combustion condition or the second combustion condition.

The first flap portion of the flap is sized to at least partially cover and substantially close the second flow portion in the first intake port when the first flap portion is disposed adjacent the opening of the first intake port. The first combustion condition is created when the flap is moved to a first position such that the first flap portion is moved away from the opening in the first intake port and the second flap portion is moved adjacent the opening in the second intake port to substantially close the opening in the second intake port.

The second combustion condition is created when the flap is moved to a second position such that the first flap portion is moved adjacent the opening in the first intake port to substantially close the second flow portion and the second flap portion is moved away from the opening in the second intake port. The first and second flap portions are independently mounted adjacent the first and second intake ports to be moved between the first position and the second position. One or more intake valves extending at least partially through one or more of the first and second intake ports that are reciprocally moved between a closed position and an actuated position wherein the intake valves allow the flow of a fluid through the first and second intake ports into the one or more cylinder bores.

In another embodiment of the disclosure, a method of combustion in an internal combustion engine includes providing at least one cylinder head attached to a block. The at least one cylinder head defines a first intake port and a second intake port, wherein each of the first and second intake ports includes a first end having an opening provided therein, an opposing second end in fluid communication with the one or more cylinder bores and an inner periphery defined between the first and second ends.

One or more operating parameters of the engine is detected and evaluated by a controller to determine the operating state of the engine. A first combustion condition is created by moving a flap to a first position to at least partially cover and substantially close the opening in the first intake port. A second combustion condition is created by moving the flap to a second position to at least partially cover and substantially close the opening in the second intake port.

A dividing member may be provided and extend at least partially through the inner periphery of the first intake port to create first and second flow portions therein. A first flap portion cooperating with the opening in the first intake port is provided and extends from an arm of the flap. A second flap portion cooperates with the opening in the second intake port and is disposed extending from the arm adjacent the first flap portion.

The step of creating the first combustion condition further comprises positioning the first flap portion adjacent the opening in the first intake port to at least partially cover and substantially close the second flow portion in the first intake port and positioning the second flap portion away from the opening in the second intake port. The step of creating the first combustion condition occurs when the controller detects an engine speed between about 700 rpm and about 3500 rpm and a mean effective pressure of about 0 bars to about 13 bars.

The step of creating the second combustion condition further comprises positioning the second flap portion adjacent the opening in the second intake port to at least partially cover and substantially close the second intake port and positioning the first flap portion away from the opening in the first intake port. The step of creating the second combustion condition occurs when the controller detects an engine speed between about 700 rpm and about 3500 rpm and a mean effective pressure of about 13 bars to about 20 bars or an engine speed between about 3500 rpm and about 7000 rpm and a mean effective pressure of about 0 bars to about 20 bars.

The above features and advantages, and other features and advantages of the present disclosure, will be readily apparent from the following detailed description of the embodiment(s) and best mode(s) for carrying out the disclosure when taken in connection with the accompanying drawings and appended claims.

BRIEF DESCRIPTION OF THE DRAWINGS

FIG. 3 is a perspective view of the cylinder head and intake port valves of the engine incorporating a combustion system to generate a swirl condition in the engine;

FIG. 4 is a schematic view showing the combustion system to generate the swirl condition;

FIG. 5 is a schematic view showing fluid flow through intake ports of the combustion system to generate the swirl condition;

FIG. 6 is a perspective view of the of the cylinder head and intake port valves of the engine incorporating a combustion system to generate a tumble condition in the engine;

FIG. 7 is a schematic view showing the combustion system to generate the tumble condition;

FIG. 8 is a schematic view showing fluid flow through intake ports of the combustion system to generate the tumble condition;

DETAILED DESCRIPTION

Figure 1:
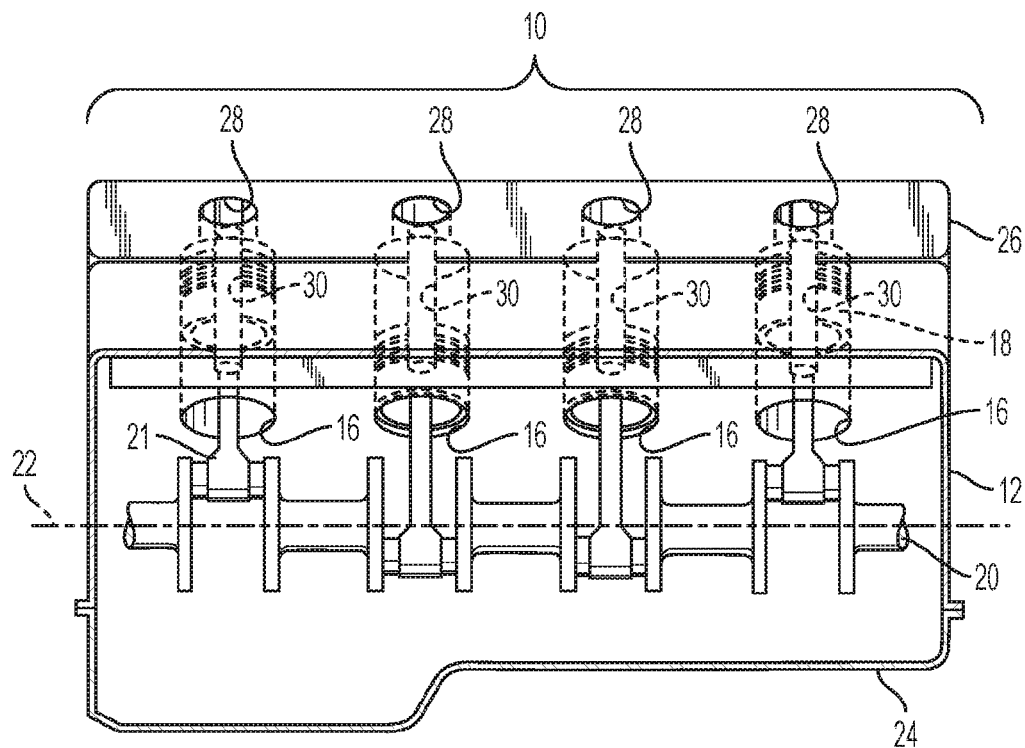
FIG. 1 is a partial cross sectional perspective view of an internal combustion engine taken parallel to a longitudinal axis of the engine.

Reference will now be made in detail to several embodiments of the disclosure that are illustrated in accompanying drawings. Whenever possible, the same or similar reference numerals are used in the drawings and the description to refer to the same or like parts or steps. The drawings are in simplified form and are not to precise scale. For purposes of convenience and clarity only, directional terms such as top, bottom, left, right, up, over, above, below, beneath, rear, and front, may be used with respect to the drawings. These and similar to directional terms are not to be construed to limit the scope of the disclosure in any manner.

Referring to the Figures, wherein like numerals indicate like parts throughout the several views, an internal combustion engine is generally shown at 10. FIG. 1 illustrates an internal combustion engine 10 that may include, for example, a diesel engine or a gasoline engine, and operate to generate a torque as is known in the art. Accordingly, the specific operation and the components of the internal combustion engine 10 that are known in the art and not pertinent to the description of the disclosure are not described in detail herein.

The internal combustion engine 10 includes a block 12. The block 12 defines a crankcase chamber, and at least one cylinder having at least one bore 16 extending from and in fluid communication with the crankcase chamber. A piston 18 is reciprocally positioned within the cylinder bore 16 and is movably connected to a crankshaft 20 by a connecting rod 21. It is contemplated that crankshaft 20 may be positioned generally along a longitudinal axis 22 extending through the crankcase chamber. It should be appreciated that the block 12 may be formed in a variety of geometries and styles, including, but not limited to, a V-style block or an in-line engine block.

In one embodiment of the disclosure, the cylinder bores 16 may be angularly offset from a second bank of bores (not shown) in a V-style engine about the longitudinal axis 22 of the block 12. An oil pan 24 may be attached to the block 12 below the crankcase chamber. The internal combustion engine 10 includes at least one cylinder head 26 attached to the engine block 12 adjacent to and generally vertically above the cylinder bores 16.

The at least one cylinder head 26 defines one or more intake ports 28. The one or more intake ports 28 have an opening provided in a first end of the one or more intake ports 28 and an opposing second end in fluid communication with each of the bores 16. In one embodiment of the disclosure, the block 12 and the at least one cylinder head 26 may cooperate to define at least one Positive Crankcase Ventilation (PCV) port 30 that extends internally between and interconnects in fluid communication the crankcase chamber and the one or more intake ports 28.

Figure 2:
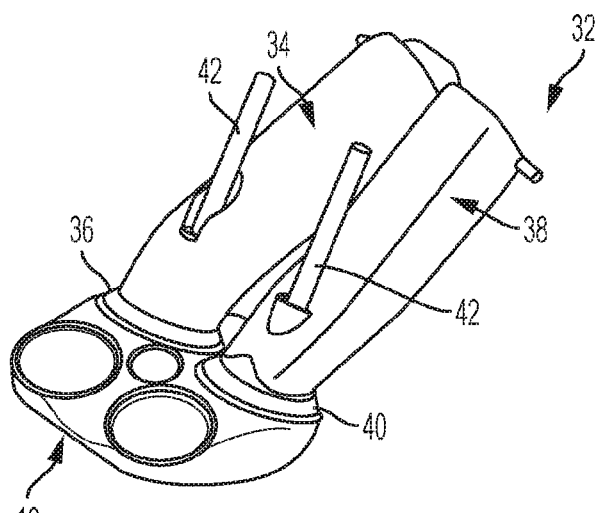
FIG. 2 is a perspective view a cylinder head an intake port valve arrangement for use with the internal combustion engine of the disclosure.

Referring additionally now to FIG. 2, the combustion system 32 of the disclosure is described in greater detail. The one or more intake ports of the cylinder head of the engine includes a first intake port 34 in fluid communication with cylinder head bore 36 and a second intake port 38 disposed adjacent to and in fluid communication with the cylinder head bore 40. One or more intake valves 42 at least partially extend through first and second intake ports 34, 38 and are reciprocally moved between a closed position and an actuated position wherein the intake valves 42 allow the flow of a fluid, such as air or an air and fluid mixture through the first and second intake ports 34, 38 into the cylinder bores.

While not shown in the Figures, it is understood that a plurality of intake valves 42 may be used with the combustion system. Further, the valves may be connected to a camshaft by a rocker arm (not shown) to reciprocally move the valves from a closed position to an actuated position. It is also contemplated that the intake valves may incorporate a valve spring that urges the spring from an actuated position to the closed position during engine operation.

The intake port arrangement of the system illustrated in FIG. 2 contemplates use of an arrangement of a pair of intake ports and corresponding valves. As shown in FIG. 2, first intake port 34 may be configured to create a first combustion or swirl condition for the combustion process while the cooperating second intake port 38 may be configured to provide a second combustion or tumble condition for the combustion process. It is understood that the position and operation of the intake ports 34, 38 may be exchanged while still accomplishing the purposes of the disclosure.

Referring now to FIGS. 3-5, the combustion system for use in generating the first combustion or swirl condition in the engine is illustrated. First intake port 34 may include a dividing member 44 extends at least partially through an inner periphery 46 of the first intake port 34. In the embodiment illustrated in FIGS. 3-5, the dividing member 44 extends between opposing sides of the inner periphery 46 of the first intake port 34 to divide the inner periphery 46 into a first or upper flow portion 48 and a second or lower flow portion 50.

While the first and second flow portion 48, 50 are shown in the Figures as upper and lower flow portions created by a generally horizontal dividing member 44 extending within the inner periphery 46 of the first intake port 34, it is understood that the geometry, size and orientation of the first and second flow portions 48, 50 may be altered to a variety of configurations to accomplish the objectives of the disclosure. Further, the dividing member may be alternatively incorporated in the second intake port 38 or alternatively, in both the first and second intake ports 34, 38.

In the embodiment shown in FIG. 3, a flap 52 may be adjustably connected to and disposed relative to first and second intake ports 34, 38. Flap 52 includes a support member or arm 56 including a first flap portion 57 removably secured to the arm 56 and disposed adjacent an opening 54 in the first intake port 34. A second flap portion 58 is removably secured to and extends from the elongate arm 56 to be disposed adjacent an opening 60 in the second intake port 38.

In one embodiment of the disclosure, the first flap portion 57 may be sized to conform to the shape of the second flow portion 50 of the first intake port 34 to at least partially cover and substantially close the opening 54 adjacent the second flow portion 50 to restrict fluid flow through the inner periphery 46 of the first intake port 34. Further, second flap portion 58 may be disposed adjacent the first flap portion 57 on arm 56 and sized to conform to the shape of the opening 60 of second intake port 38 to at least partially cover and substantially close the opening 60 in the second intake port 38 to restrict fluid flow through the inner periphery 62 of the second intake port 38.

The first intake port 34 and second intake port 38 may be disposed proximate each other such that first flap portion 57 and second flap portion 58 may be adjustably positioned relative to and disposed adjacent the openings 54, 60 of the first and second intake ports 34, 38. It is understood that the first and second flap portion 57, 58 may be removably secured to the arm 56 of the flap 52. Alternatively, first and second flap portion 57, 58 may be integrally formed with the arm 56 of flap 52.

In another embodiment of the disclosure, first and second flap portions 57, 58 may be independently mounted and positionable relative to the openings in the first and second intake ports 34, 38. In this arrangement, first and second flap portions 57, 58 may each be movably connected to an actuator 66, or in the alternative, connected to a shared actuator 66 such that a controller 64 individually or collectively actuates the first and second flap portions 57, 58 to create the first combustion or swirl condition or the second combustion or tumble condition.

The flap 52 may be configured to be adjustable between at least a first position as illustrated in FIG. 3 and a second position as illustrated in FIG. 6. As will be described in greater detail below, first and second flap portions 57, 58 of the flap cooperate with the openings 54, 60 of the first and second intake ports 34, 38 to generate a first combustion or swirl condition and a second combustion or tumble condition for the combustion process of the disclosure. As such, the first flap portion 57 may be moved between a closed position wherein the first flap portion 57 substantially closes the opening 54 as illustrated in FIG. 7 in the first intake port 34 to restrict fluid flow through the inner periphery 46 of the second intake port 34 and at least one open position wherein the first flap portion 57 is adjusted away from the opening 54 in the first intake port 34.

The second flap portion 58 is movable between at least one open position away from the opening 60 in the second intake port 38 and a closed position wherein the second flap portion 58 substantially closes the opening 60 in the second intake port 38 to restrict fluid flow through the inner periphery 62 of the second intake port 38 as is illustrated in FIG. 7. The controller 64 is in electrical communication with one or more sensors (not shown) that monitor various engine conditions, including, but not limited to, engine speed (rpm) and engine load. The actuator 66 in electrical communication with the controller 64 and operatively connected to the flap 52 may be provided to adjust the position of the flap 52 and thereby the first and second flap portions 57, 58 relative to the openings 54, 60 in the first and second intake ports 34, 38.

FIGS. 3-5 illustrate the combustion system 32 of the disclosure to create the first combustion or swirl condition for the combustion process. A swirl condition may be generated in the engine 10 when an air and fuel fluid mixture is introduced from the intake port arrangement 34, 38 into the cylinder bore 16 for combustion. The fluid flows into the cylinder bore 16 in a spiral motion about the cylinder as the piston 18 travels downward through the cylinder bore 16. The first combustion or swirl condition of system 32 may be configured for the combustion process in a lean burn mode to create a lean stratified operation mixture while maintaining torque in the engine 10 to reduce throttling losses. Use of the combustion system may reduce nitrogen oxides to improve lean stratified combustion.

Figure 9:
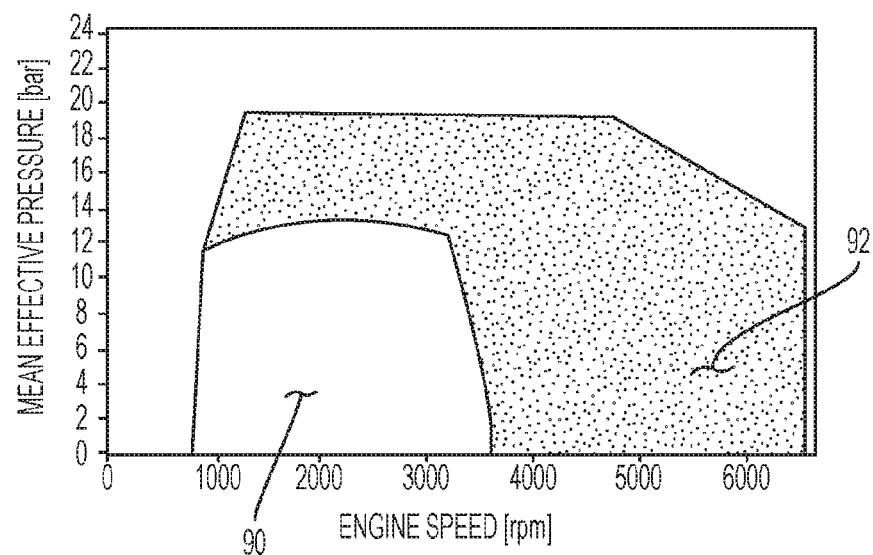
FIG. 9 is a graphical representation of engine operating modes based upon engine speed and mean effective pressure in the engine.

It is contemplated that the first combustion or swirl condition may be generally applied when the controller 64 detects that the engine 10 is operating in a low speed (rpm) and/or low load condition, namely, at an engine speed in a range between about 700 rpm and about 3500 rpm and/or the brake mean effective pressure in the engine is between 0 bars and about 13 bars. This first combustion or swirl condition engine operation range is generally identified by the stratified charge lean burn range referenced as numeral 90 in FIG. 9.

When the system creates the first combustion or swirl condition, controller 64 instructs actuator 66 to adjust the position of the arm 56 of the flap 52. Actuator moves the arm 56 such that second flap portion 58 is positioned adjacent the opening 60 in the second intake port 38 to substantially close the opening 60. The adjustment of arm 56 by actuator 66 moves the first flap portion 57 to at least one open position such that fluid may flow through the first flow portion 48 as represented by arrow 70 and through the second flow portion 50 as represented by arrow 72 through the inner periphery 46 of the first intake port 34 into the cylinder bore (not shown).

Referring now to FIGS. 6-8, the combustion system 32 is illustrated to create the second combustion or tumble condition for the combustion process. A tumble condition may be generated in the engine when a fluid mixture is introduced from the intake port arrangement 34, 38 into the cylinder bore. The mixture flows to the walls where it may be deflected downward toward the piston such that it may roll perpendicular to the cylinder axis. The second combustion or tumble condition may be applied in a homogeneous charge system wherein the air/fuel ratio is stoichiometric and power and torque are improved.

As shown in FIG. 6, first intake port 34 and second intake port 38 are proximate each other such that flap 52 may be adjustably positioned and disposed adjacent the openings 54, 60 in the first and second intake ports 34, 38. In the second combustion or tumble condition, controller 64 instructs actuator 66 to move the arm 56 and the first and second flap portions 57, 58 of flap 52. Actuator 66 adjusts arm 56 such that first flap portion 57 of the flap is positioned adjacent the opening 54 in the first intake port 34 to substantially close a portion of the opening 54 adjacent the second flow portion 50 of the first intake port 34.

Referring additionally now to FIGS. 7 and 8, a fluid mixture, represented generally by arrow 74, will flow through the first flow portion 48 of the first intake port 34 when the first flap portion 57 substantially closes the second flow portion 50. The movement of arm 56 further causes the second flap portion 58 provided adjacent the opening 60 in the second intake port 38 to be adjusted to at least one open position such that fluid may flow through the second intake port 38, a represented by arrow 76 into the cylinder bore (not shown).

It is contemplated that the second combustion or tumble condition may be generally applied when the controller 64 detects that the engine is operating in a high speed (rpm) and/or high load condition, namely, at an engine speed in a range between about 1000 rpm and about 3500 rpm where the brake mean effective pressure is between about 13 bars and about 20 bars or between about 3500 rpm and 7000 rpm where the brake mean effective pressure in the engine is between 0 bars and about 20 bars. The second combustion or tumble condition engine operation range is generally identified by the homogeneous stoichiometric range referenced as numeral 92 in FIG. 9.

Figure 10:
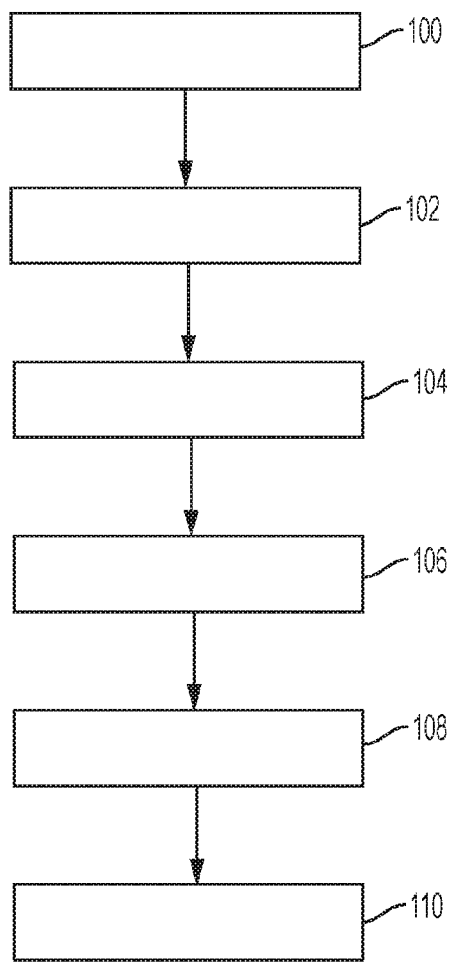
FIG. 10 is a flowchart illustrating a method of improving combustion for an internal combustion engine in accordance with the disclosure.

Referring now to FIG. 10, a method of combustion in an internal combustion engine is illustrated and described. At step or block 100, an internal combustion engine including at least one cylinder head attached to a block. The at least one cylinder head defines a first intake port and a second intake port. The first and second intake ports each include a first end having an opening provided therein, an opposing second end in fluid communication with the one or more cylinder bores and an inner periphery defined between the first and second ends.

At step or block 102, one or more sensors in communication with the controller detect one or more operating parameters of the engine. The one or more operating parameters may include, but not be limited to, engine operating speed, brake mean effective pressure and the like. At step or block 104, the controller evaluates the information associated with the one or more engine operating parameters obtained by the one or more sensors to determine the operating state of the engine.

At step or block 106, the controller instructs an actuator in electrical communication with the controller to move a flap to a first position to at least partially cover and substantially close the opening in the first intake port to create a first combustion condition. The flap may include a first flap portion extending from an arm of the flap cooperating with the opening in the first intake port and a second flap portion disposed adjacent the first flap portion extending from the arm cooperating with the opening in the second intake port.

It is contemplated that a dividing member may extend at least partially through the inner periphery of the first intake port to create first and second flow portions therein. At step or block 108, the first combustion condition may be created by positioning the first flap portion adjacent the opening in the first intake port to at least partially cover and substantially close the second flow portion in the first intake port while the second flap portion is moved away from the opening in the second intake port. In one embodiment of the disclosure, the controller will create the first combustion condition when the controller detects an engine speed between about 700 rpm and about 3500 rpm and a mean effective pressure of about 0 bars to about 13 bars.

At step or block 110, the controller instructs the actuator to move the flap to a second position to at least partially cover and substantially close the opening in the second intake port to create a second combustion condition. The second combustion process may be created by positioning the second flap portion adjacent the opening in the second intake port to at least partially cover and substantially close the second intake port and moving the first flap portion away from the opening in the first intake port. In one embodiment of the disclosure, the controller will create the second combustion condition when the controller detects either an engine speed between about 700 rpm and about 3500 rpm and a mean effective pressure of about 13 bars to about 20 bars or an engine speed between about 3500 rpm and about 7000 rpm and a mean effective pressure of about 0 bars to about 20 bars.

The detailed description and the drawings or figures are supportive and descriptive of the disclosure, but the scope of the disclosure is defined solely by the claims. While some of the best modes and other embodiments for carrying out the claimed disclosure have been described in detail, various alternative designs and embodiments exist for practicing the disclosure defined in the appended claims.

The invention claimed is:

1. An internal combustion engine comprising:
   a block defining a crankcase chamber and at least one bore extending from and in fluid communication with the crankcase chamber;
   at least one cylinder head attached to the block, the at least one cylinder head defining a first intake port and a second intake port, wherein each of the first and second intake ports includes a first end having an opening provided therein, an opposing second end in fluid communication with the one or more cylinder bores and an inner periphery defined between the first and second ends;
   a dividing member extending at least partially through the inner periphery of the first intake port to create first and second flow portions therein;
   a flap adjustably connected to the at least one cylinder head and having an arm, a first flap portion removably secured to and extending from the arm, wherein the first flap portion is sized to at least partially cover and substantially close the second flow portion of the first intake port when the first flap portion is disposed adjacent the opening of the first intake port, and a second flap portion disposed adjacent the first flap portion removably secured to and extending from the arm wherein the second flap portion is sized to at least partially cover and substantially close the second intake port when the second flap portion is disposed adjacent the opening of the second intake port;
   an actuator operatively connected to the arm of the flap to adjustably position the first and second flap portions; and
   a controller in electrical communication with the actuator configured to monitor the condition of the engine and actuate the flap with the actuator to position the first and second flap portions to generate a first combustion condition and a second combustion condition,
   wherein the first and second flap portions of the flap are configured to at least partially cover one of the first and second intake ports to restrict flow through the substantially closed port while allowing flow through the uncovered first or second intake port to generate the first and second combustion conditions.

2. The internal combustion engine of claim 1 wherein the first combustion condition is created when the flap is moved to a first position such that the first flap portion is moved away from the opening in the first intake port and the second flap portion is moved adjacent the opening in the second intake port to substantially close the opening in the second intake port.

3. The internal combustion engine of claim 1 wherein the second combustion condition is created when the flap is moved to a second position such that the first flap portion is moved adjacent the opening in the first intake port to substantially close the second flow portion and the second flap portion is moved away from the opening in the second intake port.

4. The internal combustion engine of claim 1 wherein the first and second flap portions are independently mounted adjacent the first and second intake ports and movable between the first position and the second position.

5. The internal combustion engine of claim 1 further comprising one or more intake valves extending at least partially through one or more of the first and second intake ports that are reciprocally moved between a closed position and an actuated position wherein the intake valves allow the flow of a fluid through the first and second intake ports into the one or more cylinder bores.

6. A combustion system for use with one or more cylinder bores of an internal combustion engine comprising:
   at least one cylinder head attached to a block, the at least one cylinder head defining a first intake port and a second intake port, wherein each of the first and second intake ports includes a first end having an opening provided therein, an opposing second end in fluid communication with the one or more cylinder bores and an inner periphery defined between the first and second ends;
   a dividing member extending at least partially through the inner periphery of the first intake port to create first and second flow portions therein;
   a flap adjustably connected to the at least one cylinder head and having an arm, a first flap portion removably secured to and extending from the arm, wherein the first flap portion is sized to at least partially cover and substantially close the second flow portion of the first intake port when the first flap portion is disposed adjacent the opening of the first intake port, and a second flap portion disposed adjacent the first flap portion and removably secured to and extending from the arm wherein the second flap portion is sized to at least partially cover and substantially close the second intake port when the second flap portion is disposed adjacent the opening of the second intake port;
   an actuator operatively connected to the arm of the flap to adjustably position the first and second flap portions; and
   a controller in electrical communication with the actuator configured to monitor the condition of the engine and actuate the flap with the actuator to position the first and second flap portions to generate a first combustion condition and a second combustion condition,
   wherein the first combustion condition is created when the flap is moved to a first position such that the first flap portion is moved away from the opening in the first intake port and the second flap portion is moved adjacent the opening in the second intake port to substantially close the opening in the second intake port to restrict flow through the second intake port and the second combustion condition is created when the flap is moved to a second position such that the first flap portion is moved adjacent the opening in the first intake port to substantially close the second flow portion and restrict flow through the second flow portion of the first intake port and the second flap portion is moved away from the opening in the second intake port.

7. The combustion system of claim 6 wherein the first and second flap portions are independently mounted adjacent the first and second intake ports to be moved between the first position and the second position.

8. The combustion system of claim 6 further comprising one or more intake valves extending at least partially through one or more of the first and second intake ports that are reciprocally moved between a closed position and an actuated position wherein the intake valves allow the flow of a fluid through the first and second intake ports into the one or more cylinder bores.

9. A method of combustion in an internal combustion engine comprising:
   providing at least one cylinder head attached to a block, the at least one cylinder head defining a first intake port and a second intake port, wherein each of the first and second intake ports includes a first end having an opening provided therein, an opposing second end in fluid communication with the one or more cylinder bores and an inner periphery defined between the first and second ends;
   providing a dividing member extending at least partially through the inner periphery of the first intake port to create first and second flow portions therein;
   providing a flap adjustably connected to the at least one cylinder head and having an arm, a first flap portion removably secured to and extending from the arm, sized to at least partially cover and substantially close the second flow portion of the first intake port when the first flap portion is disposed adjacent the opening of the first intake port, and a second flap portion disposed adjacent the first flap portion, removably secured to and extending from the arm and sized to at least partially cover and substantially close the second intake port when the second flap portion is disposed adjacent the opening of the second intake port, wherein the flap is configured to restrict flow through one of the openings in the first and second intake ports with one of the first or second flap portions while the other opening in the first and second intake ports is uncovered by the first or second flap portions to allow flow through the first or second intake ports to generate a first combustion condition and a second combustion condition;
   detecting one or more operating parameters of the engine;
   evaluating an operating state of the engine with a controller based upon the one or more operating parameters;
   creating the first combustion condition by moving a flap to a first position, wherein the first flap portion is positioned adjacent the opening in the first intake port to at least partially cover and substantially close the second flow portion to restrict flow into the first intake port and the second flap portion is positioned away from the opening to allow flow through the second intake port; and
   creating the second combustion condition by moving the flap to a second position, wherein the second flap portion is positioned adjacent the opening in the second intake port to at least partially cover and substantially close the second intake port to restrict flow into the second intake port and the first flap portion is positioned away from the opening in the first intake port to allow flow through the second flow portion of the first intake port.

10. The method of claim 9 wherein the step of creating the first combustion condition occurs when the controller detects an engine speed between about 700 rpm and about 3500 rpm and a mean effective pressure of about 0 bars to about 13 bars.

11. The method of claim 9 wherein the step of creating the second combustion condition occurs when the controller detects an engine speed between about 700 rpm and about 3500 rpm and a mean effective pressure of about 13 bars to about 20 bars or an engine speed between about 3500 rpm and about 7000 rpm and a mean effective pressure of about 0 bars to about 20 bars.

* * * * *